United States Patent
Wiker et al.

(10) Patent No.: US 9,546,701 B2
(45) Date of Patent: Jan. 17, 2017

(54) POWER TOOL BRAKE MECHANISM

(75) Inventors: Juergen Wiker, Mount Prospect, IL (US); Joachim Schadow, Stuttgart (DE); Joerg Maute, Sindelfingen (DE); Florian Esenwein, Leinfelden-Echterdingen (DE); Manfred Lutz, Filderstadt (DE)

(73) Assignee: Robert Bosch GmbH, Stuttgart (DE)

(\*) Notice: Subject to any disclaimer, the term of this patent is extended or adjusted under 35 U.S.C. 154(b) by 497 days.

(21) Appl. No.: 14/119,627

(22) PCT Filed: Mar. 29, 2012

(86) PCT No.: PCT/EP2012/055590
§ 371 (c)(1),
(2), (4) Date: Nov. 22, 2013

(87) PCT Pub. No.: WO2012/159803
PCT Pub. Date: Nov. 29, 2012

(65) Prior Publication Data
US 2014/0097048 A1 Apr. 10, 2014

(30) Foreign Application Priority Data
May 24, 2011 (DE) .......... 10 2011 076 370

(51) Int. Cl.
*B24B 23/02* (2006.01)
*F16D 63/00* (2006.01)

(52) U.S. Cl.
CPC .......... *F16D 63/006* (2013.01); *B24B 23/022* (2013.01)

(58) Field of Classification Search
CPC . B24B 23/02022; F16D 63/006; F16D 63/008
(Continued)

(56) References Cited

U.S. PATENT DOCUMENTS 3,224,474 A 12/1965 Bloom
3,756,354 A \* 9/1973 Clark ................ F16D 71/00
188/75

(Continued)

FOREIGN PATENT DOCUMENTS

CN 1239912 A 12/1999
CN 1876323 A 12/2006
(Continued)

OTHER PUBLICATIONS

International Search Report corresponding to PCT Application No. PCT/EP2012/055590, mailed Jul. 16, 2012 (German and English language document) (5 pages).

*Primary Examiner* — Eileen Morgan
(74) *Attorney, Agent, or Firm* — Maginot, Moore & Beck LLP

(57) ABSTRACT

A power tool brake mechanism, in particular a portable power tool brake mechanism, includes at least one mechanical brake unit that has at least one brake element mounted rotatably about a rotation axis and at least one actuating unit that has at least one movably mounted actuating element. The actuating unit is configured to activate and/or deactivate the brake unit. The power tool brake mechanism further includes at least one movement converting unit that has at least one movement converting element configured to convert a movement of the actuating element into a movement of a counter-brake element of the brake unit. The movement of the counter-brake element is at least in a direction that is different from a direction extending along the rotation axis of the brake element.

16 Claims, 4 Drawing Sheets

(58) Field of Classification Search
USPC .......................... 451/358, 359, 357, 353, 352
See application file for complete search history.

(56) References Cited

U.S. PATENT DOCUMENTS

| | | | | |
|---|---|---|---|---|
| 5,601,483 | A * | 2/1997 | Rudolf | ................. B24B 23/022 451/342 |
| 7,856,724 | B2 * | 12/2010 | Hartmann | ........ B23Q 11/0092 125/13.01 |
| 8,317,574 | B2 * | 11/2012 | Blickle | .................. B24B 23/02 294/94 |
| 9,243,674 | B2 * | 1/2016 | Esenwein | ......... B23Q 11/0092 |
| 2004/0103544 | A1 * | 6/2004 | Hartmann | ......... B23Q 11/0092 30/388 |
| 2005/0092149 | A1 * | 5/2005 | Hartmann | ............... B25F 5/001 83/58 |
| 2011/0061246 | A1 * | 3/2011 | Martinsson | .......... B27B 17/083 30/383 |
| 2013/0288581 | A1 * | 10/2013 | Esenwein | ............ B24B 23/028 451/363 |

FOREIGN PATENT DOCUMENTS

| | | |
|---|---|---|
| CN | 101254588 A | 9/2008 |
| CN | 201783922 U | 4/2011 |
| DE | 37 22 629 A1 | 1/1989 |
| EP | 1 647 366 A1 | 4/2006 |
| EP | 1 938 924 A1 | 7/2008 |
| EP | 2 364 811 A2 | 9/2011 |
| GB | 0 664 051 A | 1/1952 |
| GB | 1 253 361 A | 11/1971 |

* cited by examiner

POWER TOOL BRAKE MECHANISM

BACKGROUND

This application is a 35 U.S.C. §371 National Stage Application of PCT/EP2012/055590, filed on Mar. 29, 2012, which claims the benefit of priority to Serial No. DE 10 2011 076 370.8, filed on May 24, 2011 in Germany, the disclosures of which are incorporated herein by reference in their entirety.

SUMMARY

The disclosure is based on a power-tool braking device, in particular a hand power-tool braking device, comprising at least one mechanical braking unit, which has at least one braking element mounted so as to be rotatable about a rotation axis, and comprising at least one actuating unit, for activating and/or deactivating the braking unit, that has at least one movably mounted actuating element.

It is proposed that the power-tool braking device have at least one movement conversion unit, which has at least one movement conversion element provided to convert a movement of the actuating element into a movement of a counter-braking element of the braking unit, at least in a direction that differs from a direction extending along the rotation axis of the braking element. The expression "mechanical braking unit" is intended here to define, in particular, a braking unit provided to bring at least the counter-braking element and/or the braking element into a braking position and/or into a release position, in particular decoupled from a magnetic force, as a result of a mechanical actuation, in particular as a result of a force of a component being exerted upon the counter-braking element and/or upon the braking element by a direct contact between the component and the counter-braking element and/or the braking element. "Provided" is to be understood to mean, in particular, specially configured and/or specially equipped. A "braking position" is to be understood here to mean, in particular, a position of the counter-braking element and/or of the braking element in which, for the purpose of reducing a speed of a moving component in a predefined period of time, in particular by at least more than 50%, preferably at least more than 65%, and particularly preferably by at least more than 80%, at least one braking force is exerted upon the moving component, in at least one operating state. In this case, in particular, the predefined period of time is less than 5 s. The term "release position" is intended here to define, in particular, a position of the counter-braking element and/or of the braking element in which an action of the braking force upon the moving component for the purpose of reducing the speed is at least substantially prevented. The mechanical braking unit is preferably provided to brake the component, in particular, in a predefined period of time of greater than 0.1 s, preferably greater than 0.5 s, and particularly preferably less than 3 s, starting from a working speed, in particular to a speed that is less than 50% of the working speed, preferably less than 20% of the working speed, and particularly preferably to a speed of 0 m/s. Particularly preferably, the mechanical braking unit is realized as a friction brake.

The rotation axis of the braking element is preferably coaxial with a rotation axis of a drive shaft of a drive unit, in particular of an electric motor, of a portable power tool. Particularly preferably, the braking element is fixed to the drive shaft in a rotationally fixed manner. The braking element in this case is preferably fixed, by means of a press fit, to a fan propeller of the portable power tool that is connected to the drive shaft in a rotationally fixed manner. It is also conceivable, however, for the braking element to be fixed to the fan propeller by means of a form-fitting and/or materially closed connection. The fan propeller may be realized as a plastic component, as a metallic component and/or as another component considered appropriate by persons skilled in the art. If the fan propeller is designed as a metallic component, it is advantageously possible to prevent a thermal overload caused by a braking force. Moreover, it is also conceivable, however, for the braking element to be fixed on the armature shaft by means of a force-fitting connection such as, for example, a press fit, by means of a form-fitting connection and/or by means of a materially closed connection. Moreover, it is likewise conceivable for the braking element to be fixed to another component of the portable power tool such as, for example, a component of a transmission, etc. Particularly, preferably, the braking element is realized as a brake disk. The brake disk is preferably made of high-grade steel and/or of another material, considered appropriate by persons skilled in the art, such as, for example, sintered bronze, steel, nitrided steel, aluminum or another surface-treated steel and/or metal.

An "actuating unit" is to be understood here to mean, in particular, a unit provided to alter a state of a unit that is superordinate to the actuating unit, as a result of an actuation at least of the actuating element. Particularly preferably, the actuating unit is additionally provided, for the purpose of activating and/or additionally deactivating the mechanical braking unit, to enable and/or interrupt an energy supply to a drive unit as a result of an actuation of the actuating element. In the case of an activation of the braking unit by means of the actuating unit, the counter-braking element and/or the braking element are/is preferably brought into a braking position. In the case of a deactivation of the braking unit by means of the actuating unit, the counter-braking element and/or the braking element are/is preferably brought into a release position. Preferably, the actuating element is realized as a slide switch. It is also conceivable, however, for the actuating element to be of another design, considered appropriate by persons skilled in the art. Preferably, the actuating element has a movement axis that is different from a rotation axis of the braking element. The actuating element in this case preferably has a movement axis that is at least substantially parallel to the rotation axis of the braking element. A "movement conversion unit" is to be understood here to mean, in particular, a unit comprising a ramp, a thread, a cam mechanism, a coupler mechanism, or other mechanisms considered appropriate by persons skilled in the art, by means of which one type of movement such as, for example, a translation, can be converted into another type of movement such as, for example, a rotation and/or a superimposition of rotation and translation, and/or a movement of a component along one direction can be converted into a movement of a different component in a different direction. Preferably, the movement conversion unit is provided to convert a movement of the actuating element into a movement of the counter-braking element transversely in relation to the rotation axis, and/or into a movement of the counter-braking element about the rotation axis, by means of the movement conversion element. The expression "transversely in relation to the rotation axis" is to be understood here to mean, in particular, a direction having a course that differs from a course parallel to the rotation axis, and that, in particular, together with the rotation axis, encloses an angle that differs from 0° and from 360° or that differs from an integral multiple of 360°. The design of the power-tool braking device according to the disclosure makes it possible, advantageously, to achieve an activation and/or deactivation of the braking unit that is dependent on an actuation of the actuating element.

It is furthermore proposed that the movement conversion element be pivotably mounted. The expression "pivotably mounted" is intended here to define, in particular, a mounting of the movement conversion element, wherein the movement conversion element is able to move, about at least one axis, by an angle greater than 1°, preferably greater than 5°, and particularly preferably leas than 45°. In this case, a pivot axis of the movement conversion element is preferably perpendicular to the rotation axis of the braking element. In an alternative design, a pivot axis of the movement conversion element is preferably coaxial with the rotation axis of the braking element. Through simple design means, a movement of the actuating element can be used, advantageously, to activate and/or deactivate the braking unit. Moreover, advantageously, the counter-braking element can be coupled to and/or decoupled from the braking element, through simple design means.

Advantageously, the braking unit has at least one spring element, which is provided to apply a spring force to the counter-braking element in the direction of the braking element. A "spring element" is to be understood to mean, in particular, a macroscopic element having at least one extent that, in a normal operating state, can be varied elastically by at least 10%, in particular by at least 20%, preferably by at least 30%, and particularly advantageously by at least 50% and that, in particular, generates a counter-force, which is dependent on the variation of the extent and preferably proportional to the variation and which counteracts the variation. An "extent" of an element is to be understood to mean, in particular, a maximum distance of two points of a perpendicular projection of the element on to a plane. A "macroscopic element" is to be understood to mean, in particular, an element having an extent of at least 1 mm, in particular of at least 5 mm, and preferably of at least 10 mm. The spring element is preferably provided to apply a spring force to the counter-braking element along a direction that is at least substantially perpendicular to the rotation axis of the braking element. The expression "substantially perpendicular" is intended here to define, in particular, an alignment of a direction relative to a reference direction, the direction and the relative direction, in particular as viewed in one plane, enclosing an angle of 90° and the angle having a maximum deviation of, in particular, less than 8°, advantageously less than 5°, and particularly advantageously less than 2°. It is also conceivable, however, for the movement conversion element to be capable of effecting a force, which acts upon the counter-braking element in the direction of the braking element, as a result of an elastic deformability. In an alternative design, the spring element is preferably provided to apply a spring force to the counter-braking element a direction extending along the rotation axis of the braking element. It can thus be ensured, advantageously, that the counter-braking element bears against the braking element in at least one operating state. Moreover, advantageously, the counter-braking element can be automatically reset to a braking position, at least in one operating state.

It is additionally proposed that the movement conversion element be realized as a rocker, which has a pivot axis that it at least substantially perpendicular to the rotation axis. The expression "rocker" is intended here to define, in particular, a component having at least one rotatably mounted limb. Preferably, the limb is rotatably mounted at one end. It is also conceivable, however, for the limb to be rotatably mounted at a different point on the limb, considered appropriate by persons skilled in the art, such as, for example, at a point on the limb that is at least substantially equidistant from two ends of the limb. The rocker may be realized as a plastic component, as a fiber-reinforced component, as a metallic component, as a hybrid component and/or as another component, considered appropriate by persons skilled in the art. The design of the movement conversion element as a rocker makes it possible to achieve a compact movement conversion element.

Preferably, the rocker has at least one angled region, which, for the purpose of converting the movement of the actuating element, acts in combination with a coupling element of the actuating unit that is fixed to the actuating element. An "angled region" is to be understood here to mean, in particular, a region of the rocker that, with a longitudinal axis of the rocker, encloses an angle that differs from 0°, from 90°, from 180° and from 360°, or from an integral multiple of 360°. Preferably, the angled region is constituted by a ramp, which is integral with the limb of the rocker. The coupling element is preferably fixed to the actuating element by means of a latching connection. It is also conceivable, however, for the coupling element to be fixed to the actuating element by means of another type of connection, considered appropriate by persons skilled in the art. Through simple design means, a movement of the actuating element can be converted into a movement of the rocker.

Advantageously, the counter-braking element is fixed to the rocker. Preferably, the counter-braking element is fixed to the rocker by means of a materially closed connection. It is also conceivable, however, for the counter-braking element to be fixed to the rocker by means of a form-fitting connection and/or by means of a force-fitting connection. The counter-braking element is preferably realized as a brake lining. The brake lining in this case may be realized as a sintered brake lining, as an organic brake lining, as a brake lining made of carbon, as a brake lining made of ceramic, or as another brake lining considered appropriate by persons skilled in the art. Particularly preferably, the brake lining has a V-shaped groove, in which the braking element engages, at least in a braking position, and bears against edge regions delimiting the groove. It is also conceivable, however, for the brake lining to be of another shape, considered appropriate by persons skilled in the art, in the region of an interface between the counter-braking element and the braking element. The braking element, in the region of the interface between the counter-braking element and the braking element, is preferably of a shape that corresponds to the V-shaped groove of the brake lining. Advantageously, the design of the power-tool braking device according to the disclosure makes it possible to achieve a space-saving structural design.

In an alternative design of the power-tool braking device, it is proposed that the movement conversion unit be realized as a cam mechanism. A "cam mechanism" is to be understood here to mean, in particular, a mechanism that, as a result of a movement of a first cam member and as a result of acting in combination with a second cam member, operates a component that, as a result, executes a movement defined by the combined action of the cam members. The cam mechanism in this case may be of any design considered appropriate by persons skilled in the art. It is conceivable, for example, for rolling bodies of the cam mechanism to be disposed on the counter-braking element, which rolling bodies roll on ramps that are disposed in grooves for guiding the rolling bodies, in a housing of the portable power tool.

It is likewise conceivable, however, for the counter-braking element to effect a pivoting motion about the rotation axis of the braking element by means of a transmission, as a result of an actuation by the actuating element, ramps of the cam mechanism being disposed, respectively, on the counter-braking element and on the housing. In this case, for the purpose of reducing a friction, the ramps may be provided with, for example, a Teflon layer and/or other coatings considered appropriate by persons skilled in the art. Advantageously, the cam mechanism makes it possible to achieve self-locking of the braking unit, at least in one operating state.

It is additionally proposed that the movement conversion element be realized as a pin, which, for the purpose of converting the movement of the actuating element, acts in combination with at least one further movement conversion element of the movement conversion unit. The pin is preferably disposed on a circumference of the counter-braking element. The circumference in this case extends along a circumferential direction, which runs in a plane extending at least substantially perpendicularly in relation to the rotation axis of the braking element. Guidance during a movement of the counter-braking element can be achieved through simple design means.

Preferably, the further movement conversion element is realized as a groove, in which the pin engages, at least partially. The groove is preferably disposed in an inner wall of the housing of the portable power tool, which inner wall faces toward the counter-braking element. It is also conceivable, however, for the groove to be disposed on the counter-braking element and for the pin to be disposed on the inner wall of the housing. Particularly preferably, the groove has a course extending transversely in relation to the rotation axis. Through simple design means, therefore, it is possible to achieve a cam mechanism for converting a movement, in particular into a movement constituted by a superimposition of a rotation and a translation.

The disclosure is additionally based on a portable power tool having at least one power-tool switching device according to the disclosure. A "portable power tool" is to be understood here to mean, in particular, a power tool, in particular a hand-held power tool, that can be transported by an operator without the use of a transport machine. The portable power tool has, in particular, a mass of less than 50 kg, preferably less than 20 kg, and particularly preferably less than 10 kg. Particularly preferably, the portable power tool is realized as an angle grinder. It is also conceivable, however, for the portable power tool to be of another design considered appropriate by persons skilled in the art, such as, for example, designed as a hand-held planer, as a multifunction power tool, as a portable router, as a sander, and/or as an electrically operated garden appliance. Advantageously, for an operator of the portable power tool, a high degree of operating comfort can be achieved.

The power-tool braking device according to the disclosure is not intended in this case to be limited to the application and embodiment described above. In particular, the power-tool braking device according to the disclosure, for the purpose of implementing a functioning mode described herein, may have a number of individual elements, components, devices and units that differs from a number stated herein.

BRIEF DESCRIPTION OF THE DRAWING

Further advantages are given by the following description of the drawings. The drawings show exemplary embodiments of the disclosure. The drawings, the description and the claims contain numerous features in combination. Persons skilled in the art will also expediently consider the features individually and combine them to create appropriate further combinations.

In the drawing:
In the drawings.

DETAILED DESCRIPTION

Figure 1:
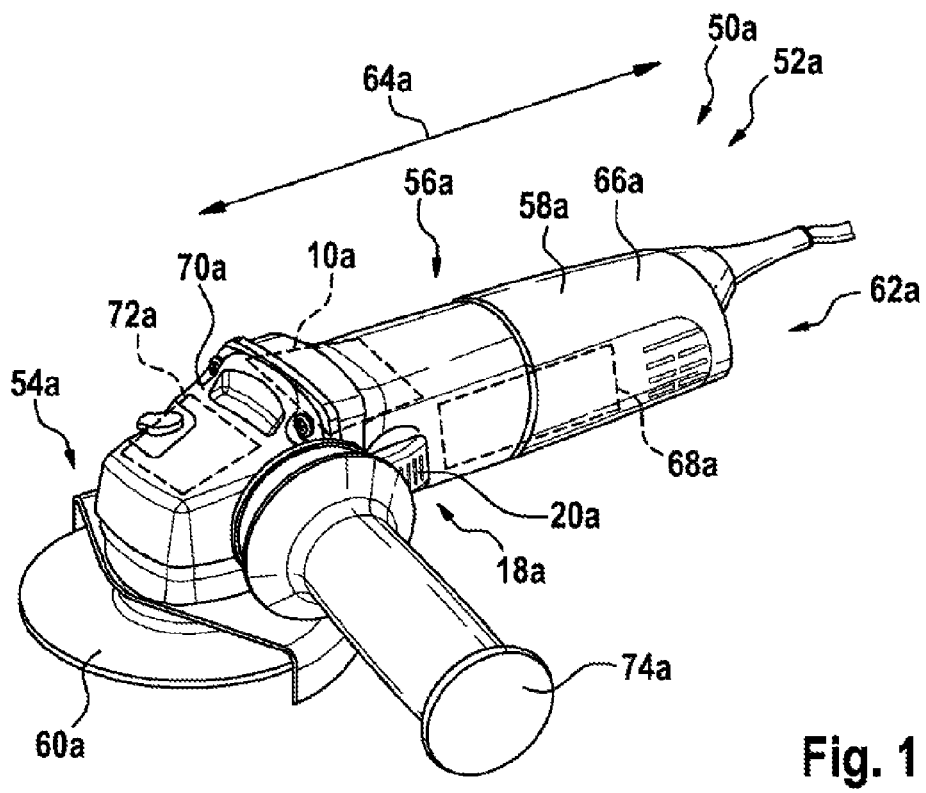
FIG. 1 shows a power tool according to the disclosure having a power-tool braking device according to the disclosure, in a schematic representation.

FIG. 1 shows a portable power tool 50a, realized as an angle grinder 52a, having a power-tool braking device 10a. The angle grinder 52a comprises a protective hood unit 54a, a power-tool housing 56a and a main handle 58a. From a transmission housing 70a of the power-tool housing 56a, the main handle 58a extends out, in a direction that is oriented away from the transmission housing 70a and that is at least substantially parallel to a direction of main extent 64a of the angle grinder 52a, as far as a side 62a of the power-tool housing 56a on which there is disposed an energy supply cable of the angle grinder 52a. The main handle 58a constitutes a motor housing 66a of the power-tool housing 56a. Extending out from the transmission housing 70a is a spindle (not represented in greater detail here), to which a working tool 60a can be fixed for the purpose of performing work on a workpiece (not represented in greater detail here). The working tool 60a is realized as an abrasive disk. It is also conceivable, however, for the working tool 60a to be realized as a parting or polishing disk. The power-tool housing 56a comprises a motor housing 66a, for accommodating a drive unit 68a of the angle grinder 52a, and the transmission housing 70a, for accommodating an output unit 72a of the angle grinder 52a. The drive unit 68a is provided to drive the working tool 60a in rotation, via the output unit 72a. The output unit 72a is connected to the drive unit 68a, via a drive element (not represented in greater detail here) of the drive unit 68*a* that can be driven in rotation in a manner already known to persons skilled in the art. An ancillary handle 74*a* is disposed on the transmission housing 70*a*. The ancillary handle 74*a* extends transversely in relation to the direction of main extent 64*a* of the angle grinder 52*a*.

Figure 2:
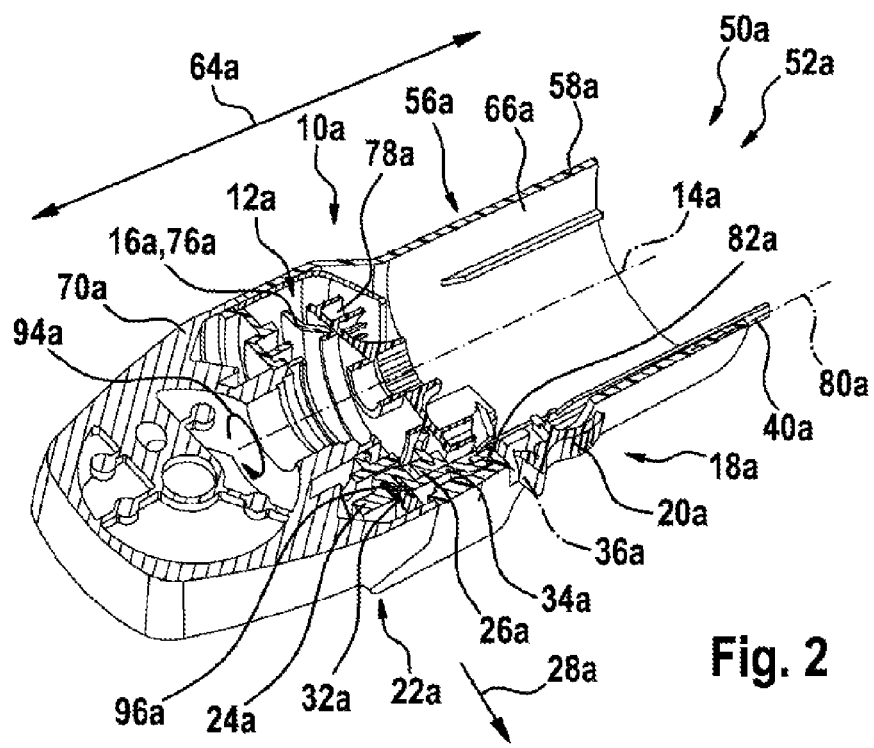
FIG. 2 shows a detail view of the power-tool braking device according to the disclosure, wherein the power-tool braking device according to the disclosure is in a braking position, in a schematic representation.

FIG. 2 shows a detail view of the power-tool braking device 10*a*, wherein the power-tool braking device 10*a* is in a mounted state in the power-tool housing 56*a*. The power-tool braking device 10*a* comprises a mechanical braking unit 12*a*, which has a braking element 16*a* mounted so as to be rotatable about a rotation axis 14*a*, and has an actuating unit 18*a*, for activating and/or deactivating the braking unit 12*a*, that has a movably mounted actuating element 20*a*. The braking element 16*a* is realized as a brake disk 76*a*. The brake disk 76*a* is fixed to a fan propeller 78*a* of the drive unit 68*a* by means of a force-fitting connection such as, for example, a press fit. The brake disk 76*a* in this case is disposed on a side of the fan propeller 78*a* that faces toward the output unit 72*a*. The fan propeller 78*a* is connected to the drive shaft (not represented in greater detail here) in a rotationally fixed manner by means of a force-fitting connection, in a manner already known to persons skilled in the art. It is also conceivable, however, for the fan propeller 78*a* to be connected to the drive shaft in a rotationally fixed manner by means of a form-fitting connection and/or by means of a materially closed connection. The rotation axis 14*a* of the braking element 16*a* is thus coaxial with a rotation axis of the drive shaft.

The actuating element 20*a* of the actuating unit 18*a* is realized as a slide switch. The actuating element 20*a* in this case has a movement axis 80*a* that is at least substantially parallel to the rotation axis 14*a* of the braking element 16*a*. The actuating element 20*a* is mounted on the motor housing 66*a* so as to be translationally movable along the movement axis 80*a*. In addition to being provided for the purpose of activating and/or deactivating the braking unit 12*a*, the actuating element 20*a* is provided to close an electric circuit for supplying energy to the drive unit 68*a*, to enable the angle grinder 52*a* to be put into operation. The actuating element 20*a* is provided to close an electric circuit by means of an actuation of a switch (not represented in greater detail here) of the angle grinder 52*a*.

Furthermore, the power-tool braking device 10*a* comprises a movement conversion unit 22*a*, which has a movement conversion element 24*a*, provided to convert a movement of the actuating element 20*a* into a movement of a counter-braking element 26*a* of the braking unit 12*a*, in a direction 28*a* that differs from a direction extending along the rotation axis 14*a* of the braking element 16*a*. The movement conversion element 24*a* is pivotably mounted. The movement conversion element 24*a* in this case is realized as a rocker 34*a*, which has a pivot axis 36*a* that is at least substantially perpendicular to the rotation axis 14*a*. When in a mounted state, the rocker 34*a* is pivotably mounted, via one end, in a bearing recess 82*a* of the motor housing 66*a*. The bearing recess 82*a*, in a cross section, as viewed in a plane that is at least substantially perpendicular to the pivot axis 36*a* of the rocker 34*a*, has shape in the form of a U, which is open on a side that faces toward the transmission housing 70*a*. The end of the rocker 34*a* that is disposed in the bearing recess 82*a* has a spherical shape. The U-shape of the bearing recess 82*a* and the spherical shape of the end of the rocker 34*a* that is disposed in the bearing recess 82*a* act in combination, enabling the rocker 34*a* to be mounted in a pivotable manner. It is also conceivable, however, for the pivotable mounting of the rocker 34*a* to be of a different design, considered appropriate by persons skilled in the art.

Figure 4:
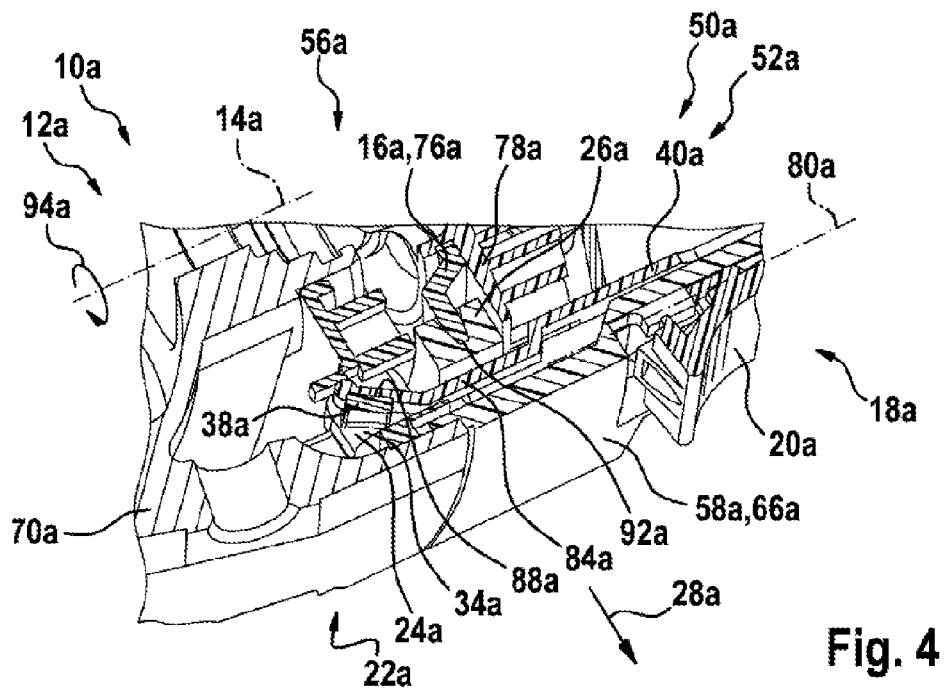
FIG. 4 shows a further detail view of the power-tool braking device according to the disclosure, wherein the power-tool braking device according to the disclosure is in a braking position, in a schematic representation.
Figure 5:
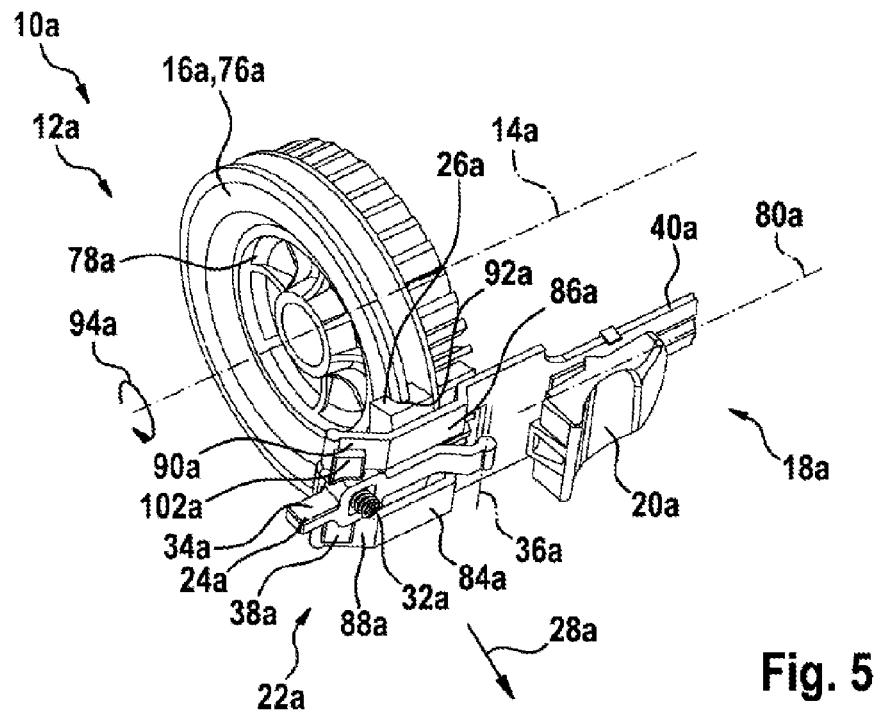
FIG. 5 shows a further detail view of the power-tool braking device according to the disclosure, in a from a power-tool housing of the power tool according to the disclosure, in a schematic representation.

The rocker 34*a* furthermore has two angled region 38*a*, 102*a* that, for the purpose of converting the movement of the actuating element 20*a*, act in combination with a coupling element 40*a* of the actuating unit 18*a* that is fixed to the actuating element 20*a* (FIG. 5). The angled regions 38*a*, 102*a* are disposed at an end of the rocker 34*a* that faces away from the end of the rocker 34*a* that is disposed in the bearing recess 82*a*. The coupling element 40*a* is realized as a switch bar. The coupling element 40*a* in this case is mounted so as to be movable translationally in the motor housing 66*a*. On a side that faces toward the rocker 34*a*, the coupling element 40*a* has two actuating extensions 84*a*, 86*a* (FIG. 5), extending at least substantially parallelwise in the direction of the rocker 34*a*. When in a mounted state, the actuating extensions 84*a*, 86*a*, as viewed along the pivot axis 36*a* of the rocker 34*a*, are disposed at a distance relative to each other. At their ends that face toward the rocker 34*a*, the actuating extensions 84*a*, 86*a* each have a respective angled actuating region 88*a*, 90*a*. The actuating regions 88*a*, 90*a* are provided, by acting in combination with the angled regions 38*a*, 102*a*, to move the rocker 34*a* in a direction oriented away from the drive shaft. The actuating regions 88*a*, 90*a* in this case are angled relative to the movement axis 80*a*. The actuating regions 88*a*, 90*a* are additionally provided to slide, respectively, on the angled regions 38*a*, 102*a* in the case of a translational movement of the coupling element 40*a* for the purpose of moving the rocker 34*a* (FIG. 4). It is conceivable in this case for each of the angled regions 38*a*, 102*a* to have a coating to reduce friction, such as, for example, a Teflon coating, on a side of the angled regions 38*a*, 102*a* that faces toward the actuating regions 88*a*, 90*a*. It is also conceivable, however, for each of the actuating regions 88*a*, 90*a* to have a coating to reduce friction on a side of the actuating regions 88*a*, 90*a* that faces toward the angled regions 38*a*, 102*a*, or for the angled regions 38*a*, 102*a* and the actuating regions 88*a*, 90*a* each to have a coating to reduce friction.

The counter-braking element 26*a* of the braking unit 12*a* is fixed to the rocker 34*a*. The counter-braking element 26*a* in this case is fixed to the rocker 34*a* by means of a materially closed connection such as, for example, by adhesive bonding, sintering, etc. It is also conceivable, however, for the counter-braking element 26*a* to be fixed to the rocker 34*a* by means of a form-fitting connection and/or by means of a force-fitting connection. It is conceivable, for example, for the counter-braking element 26*a* to be fixed to the rocker 34*a* by means of a bayonet closure and/or to be disposed in a form-fitting manner in a recess and to be secured in a force-fitting manner, by means of a compression spring, against falling out. As a result, the counter-braking element 26*a* can be exchanged, in particular if the counter-braking element 26*a* has become worn. The counter-braking element 26*a* is disposed along a substantially perpendicular to the rotation axis 14*a* of the braking element 16*a* spatially between the braking element 16*a*, realized as a brake disk 76*a*, and the rocker 34*a*. In addition, upon a movement of the rocker 34*a*, the counter-braking element 26*a* is likewise moved in a direction oriented away from the drive shaft. As a result of this, the counter-braking element 26*a* of the braking unit 12*a*, starting from the braking position of the counter-braking element 26*a* shown in FIGS. 2 to 5, can be brought into a release position. When the counter-braking element 26*a* is in a release position, the braking unit 12*a* is deactivated. In addition, the counter-braking element 26*a* can be brought out of the release position and into a braking position by means of upon a movement of the rocker 34a in a direction oriented toward the drive shaft.

The counter-braking element 26a fixed to the rocker 34a is realized as a brake lining, which has a V-shaped groove 92a. The V-shaped groove 92a is realized in a side of the counter-braking element 26a that faces toward the braking element 16a realized as a brake disk 76a. The braking element 16a realized as a brake disk 76a in this case has a V-shaped cross section along a circumference of the braking element 16a realized as a brake disk 76a, as viewed in a plane that runs through the rotation axis 14a of the braking element 16a. The circumference of the braking element 16a in this case runs along a circumferential direction 94a, which runs in a plane extending at least substantially perpendicularly in relation to the rotation axis 14a of the braking element 16a. When the counter-braking element 26a is in a braking position, the V-shaped cross section of the braking element 16a, realized as a brake disk 76a, and edge regions of the counter-braking element 26a, which delimit the V-shaped groove 92a, contact each other, and form a frictional contact. As a result of this, upon a rotary movement of the braking element 16a, realized as a brake disk 76a, about the rotation axis 14a, a frictional force can be generated, which brakes the rotating braking element 16a. As a result of this, the drive shaft, on which the braking element 16a is fixed in a rotationally fixed manner together with the fan propeller 78a, is likewise braked. When the counter-braking element 26a is in a release position, the braking element 16a and the counter-braking element 26a are at least substantially free of contact.

Figure 3:
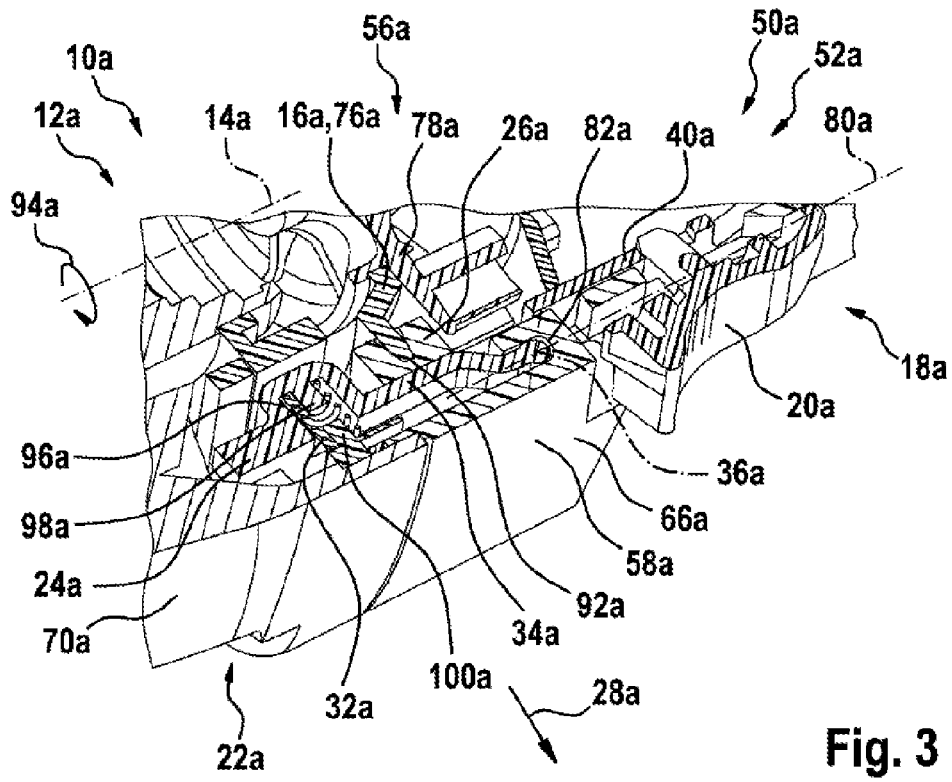
FIG. 3 shows a further detail view of the power-tool braking device according to the disclosure, wherein the power-tool braking device according to the disclosure is in a braking position, in a schematic representation.

The braking unit 12a furthermore has a spring element 32a, which is provided to apply a spring force to the counter-braking element 26a in the direction of the braking element 16a (FIGS. 3 and 5). The spring element 32a is realized as a compression spring. It is also conceivable, however, for the spring element 32a to be of a different design, considered appropriate by persons skilled in the art. The spring element 32a is disposed, along the direction that is at least substantially perpendicular to the rotation axis 14a of the braking element 16a, spatially between the rocker 34a and the transmission housing 70a and/or the motor housing 66a. In this case, the spring element 32a is disposed in a recess 96a in the rocker 34a. The spring element 32a, via an end that faces toward the rocker 34a, is supported on an edge region of the rocker 34a that delimits the recess. Via another end, the spring element 32a is supported on the transmission housing 70a and/or the motor housing 66a. It is also conceivable, however, for the spring element 32a to be supported on other components of the angle grinder 52a that are disposed inside the transmission housing 70a and/or inside the motor housing 66a, such as, for example, on an air-guide ring of the angle grinder 52a, etc. In addition, the edge region, delimiting the recess 96a, and the transmission housing 70a and/or the motor housing 66a each have/has a pin-type extension 98a, 100a, which in each case is provided to guide the spring element 32a.

For the purpose of putting the angle grinder 52a into operation, the actuating element 20a of the actuating unit 18a is actuated by an operator. The operator in this case displaces the actuating element 20a translationally, in the direction of the transmission housing 70a, out of an initial position in a recess of the motor housing 66a. As a result of the translational movement of the actuating element 20a in the direction of the transmission housing 70a, the coupling element 40a, which is fixed to the actuating element 20a, is likewise moved in the direction of the transmission housing 70a. The actuating regions 88a, 90a of the coupling element 40a come into contact with the angled regions 38a, 102a of the rocker 34a and, during the movement of the coupling element 40a in the direction of the transmission housing 70a, slide on the angled regions 38a, 102a of the rocker 34a. As a result of this, the rocker 34a is moved, about the pivot axis 36a, in the direction oriented away from the rotation axis 14a of the braking element 16a, toward an inner wall of the transmission housing 70a. The spring element 32a thereby becomes compressed. As a result of the movement of the rocker 34a, the counter-braking element 26a is moved in the direction oriented away from the rotation axis 14a of the braking element 16a. As a result of this, the frictional contact between the braking element 16a, realized as a brake disk 76a, and the counter-braking element 26a is removed. When the actuating element 20a is in an end position, in which the counter-braking element 26a has been brought into a release position because of the movement conversion unit 22a, the V-shaped cross section of the braking element 16a consequently does not contact the edge regions of the counter-braking element 26a that delimit the V-shaped groove 92a. In addition, when the actuating element 20a is in the end position, the electric circuit for supplying energy to the drive unit 68a is closed. It is also conceivable, however, for the electric circuit to be closed before the end position of the actuating element 20a is attained, to enable the drive unit 68a to be started with a low braking load, for a soft start-up. As a result of the removal of the frictional contact between the braking element 16a and the counter-braking element 26a, the braking element 16a can execute a rotary movement about the rotation axis 14a, as a result of being driven by the drive unit 68a. Consequently, the drive shaft of the drive unit 68a can likewise execute a rotary motion, to enable work to be performed on a workpiece (not represented in greater detail here) by means of the working tool 60a, by the angle grinder 52a.

For the purpose of interrupting an operation of the angle grinder 52a, the actuating element 20a is moved translationally by the operator, out of the end position, in the direction of the main handle 58a, in a direction oriented away from the transmission housing 70a. As a result of this, the coupling element 40a is likewise moved in the direction of the main handle 58a. During the movement, the actuating regions 88a, 90a of the coupling element 40a slide on the angled regions 38a, 102a of the rocker 34a. As a result of the actuating regions 88a, 90a acting in combination with the angled regions 38a, 102a, during the movement, a movement possibility of the rocker 34a, in the direction of the rotation axis 14a of the braking element 16a, is released. As a result of a spring force of the spring element 32a, the rocker 34a is moved in the direction of the rotation axis 14a of the braking element 16a. The counter-braking element 26a is likewise moved in the direction of the rotation axis 14a. The edge regions of the counter-braking element 26a that delimit the V-shaped groove 92a come into contact with the V-shaped cross section of the braking element 16a. The frictional contact between the braking element 16a and the counter-braking element 26a is consequently closed.

As soon as the actuating element 20a has been moved into the initial position, the counter-braking element 26a is in the braking position. A rotary movement of the braking element 16a is braked by means of the frictional contact between the braking element 16a and the counter-braking element 26a. Since the fan propeller 78a is connected in a rotationally fixed manner to the drive shaft, and since the braking element 16a is connected in a rotationally fixed manner to the fan propeller 78a, a coasting-down rotary motion of the drive shaft, following an interruption of an energy supply, or following switch-off of the angle grinder 52a by an actuation of the actuating element 20a, is braked. When the counter-braking element 26a is in the braking position, a spring force of the spring element 32a is always applied to the counter-braking element 26a in the direction of the braking element 16a.

Figure 6:
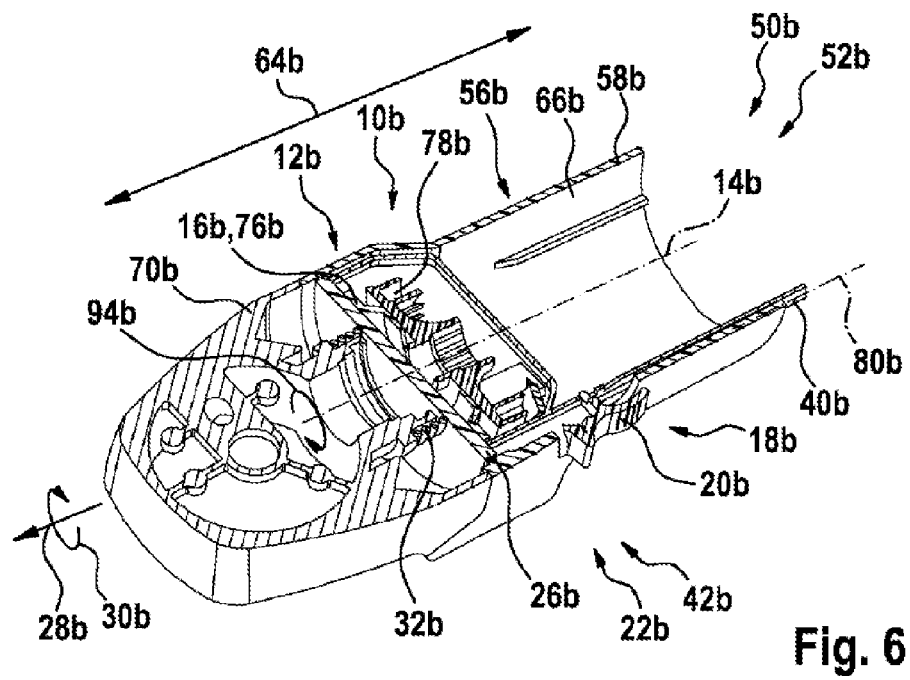
FIG. 6 shows a detail view of an alternative power-tool braking device according to the disclosure, wherein the alternative power-tool braking device according to the disclosure is in a braking position, in a schematic representation.
Figure 7:
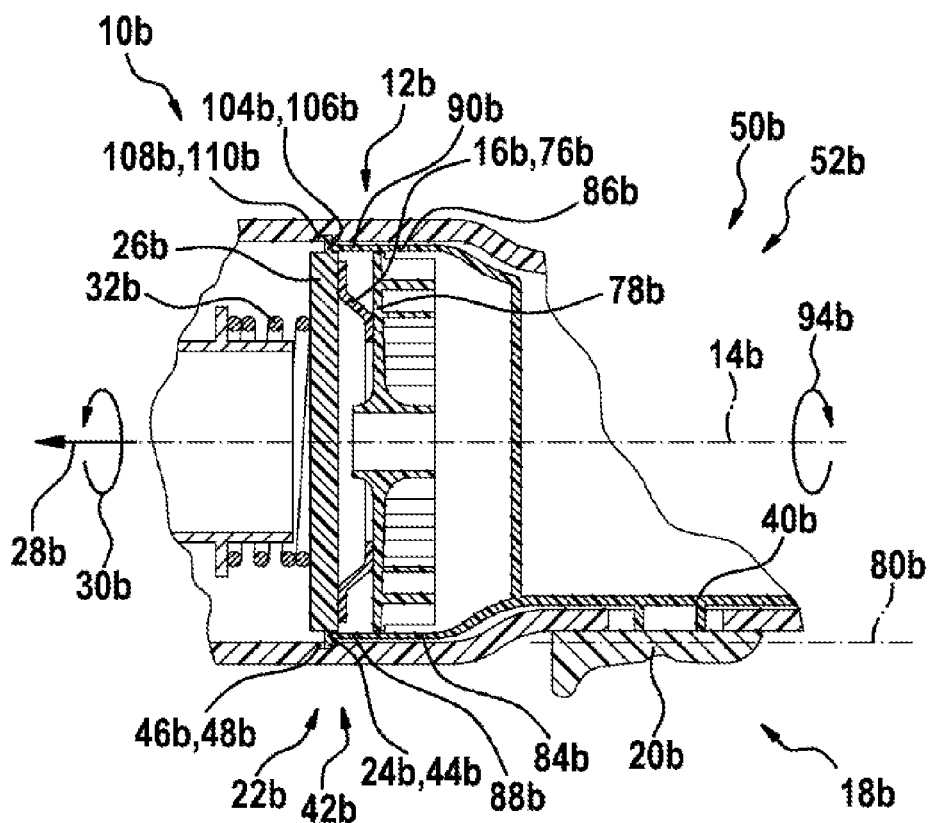
FIG. 7 shows a further detail view of the alternative power-tool braking device according to the disclosure, wherein the power-tool braking device according to the disclosure is in a braking position, in a schematic representation.
Figure 8:
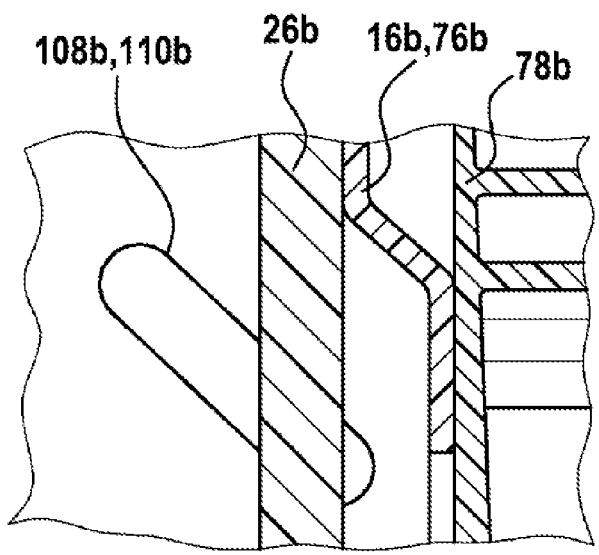
FIG. 8 shows a detail view of a movement conversion unit of the alternative power-tool braking device according to the disclosure, in a schematic representation.

An alternative exemplary embodiment is represented in FIGS. 6 to 8. Components, features and functions that remain substantially the same are denoted by essentially the same references. To differentiate the exemplary embodiments, the letters a and b are appended to the references of the exemplary embodiments. The description that follows is limited essentially to the differences in respect of the first exemplary embodiment in FIGS. 1 to 5, and reference may be made to the description of the first exemplary embodiment in FIGS. 1 to 5 in respect of components, features and functions that remain the same.

FIG. 6 shows a detail view of an alternative power-tool braking device 10b, wherein the power-tool braking device 10b is mounted in a power-tool housing 56b of an angle grinder 52b. The angle grinder 52b has a structure similar to that of the angle grinder 52a described in FIGS. 1 to 5. The power-tool braking device 10b comprises a mechanical braking unit 12b, which has a braking element 16b that is mounted so as to be rotatable about a rotation axis 14b, and has an actuating unit 18b, for activating and/or deactivating the braking unit 12b, that has a movably mounted actuating element 20b. In addition, the power-tool braking device 10b has a movement conversion unit 22b, which has a movement conversion element 24b, provided to convert a movement of the actuating element 20b into a movement of a counter-braking element 26b of the braking unit 12b, in a direction 28b, 30b that differs from a direction extending along the rotation axis 14b of the braking element 16b. The counter-braking element 26b is realized as a disk-shaped brake linking, which is disposed, along a direction of main extent 64b, between the pressed-on braking element 16b, on a fan propeller 78b that is connected in a rotationally fixed manner to a drive shaft, and a transmission housing 70b of the angle grinder 52b. The braking unit 12b in this case has a spring element 32b, which is provided to apply a spring force to the counter-braking element 26b in the direction of the braking element 16b. The spring element 32b in this case is supported, via an end, on the transmission housing 70b. The spring element 32b is additionally supported, via another end, on the counter-braking element 26b.

The movement conversion unit 22b is realized as a cam mechanism 42b. The cam mechanism 42b has two movement conversion elements 24b, 104b. It is also conceivable, however, for the movement conversion unit 22b to have a number of movement conversion elements 24b, 104b other than two. The movement conversion elements 24b, 104b are mounted so as to be pivotable about the rotation axis 14b. The movement conversion elements 24b, 104b in this case are realized as pins 44b, 106b, which each respectively act in combination with a further movement conversion element 46b, 108b of the movement conversion unit 22b, for the purpose of converting the movement of the actuating element 20b. The further movement conversion elements 46b, 106b are each realized as a groove 48b, 110b, in which a pin 44b, 106b engages, at least partially, in each case (FIG. 7).

The movement conversion elements 24b, 104b, realized as pins 44b, 106b, are disposed, uniformly along a circumferential direction 94b, on a circumference of the counter-braking element 26b (FIG. 8). The circumferential direction 94b runs in a plane that extends at least substantially perpendicularly in relation to the rotation axis 14b of the braking element 16b. The pins 44b, 106b are integral with the counter-braking element 26b. The further movement conversion elements 46b, 108b, realized as grooves 48b, 110b, are realized in an inner wall of a power-tool housing 56b of the angle grinder 52b that faces toward the braking element 16b. The grooves 48b, 110b extend in a plane that is angled in relation to a rotation axis 14b. It is also conceivable, however, for the pins 44b, 106b to be disposed on the inner wall, and for the grooves 48b, 110b to be disposed on the counter-braking element 26b. It is additionally conceivable for the cam mechanism 42b to be of another design, considered appropriate by persons skilled in the art, by means of which a translational movement can be converted into a rotational movement on which a translational movement is superimposed.

For the purpose of putting the angle grinder 52b into operation, the actuating element 20b of the actuating unit 18b is actuated by an operator. The operator in this case displaces the actuating element 20b translationally, in the direction of the transmission housing 70b, out of an initial position in a recess of the motor housing 66b of the angle grinder 52b, into an end position of the actuating element 20b. As a result of the translational movement of the actuating element 20b in the direction of the transmission housing 70b, a coupling element 40b, which is fixed to the actuating element 20b, is likewise moved in the direction of the transmission housing 70b. An actuating region 88b of the coupling element 40b comes into contact with the counter-braking element 26b and, during the movement in the direction of the transmission housing 70b, exerts a force upon the counter-braking element 26b, in the direction of the transmission housing 70b. As a result of the action of the force of the coupling element, and as a result of the pins 44b, 106b acting in combination with the grooves 48b, 110b, the counter-braking element 26b is pivoted about the rotation axis 14b, contrary to a spring force of the spring element 32b, along a direction 28b, and at the same time is moved along a direction 30b, in the direction of the transmission housing 70b. As a result of this, a frictional contact between the counter-braking element 26b and the braking element 16b is removed, and the drive shaft is released.

For the purpose of interrupting an operation of the angle grinder 52b, the actuating element 20b is moved translationally by the operator, out of the end position, in the direction of a main handle (not represented in greater detail here) of the angle grinder 52b, in a direction oriented away from the transmission housing 70b. As a result of this, the coupling element 40b is likewise moved in the direction of the main handle. Consequently, the coupling element 40b releases a movement possibility of the counter-braking element 26b in the direction of the braking element 16b. The counter-braking element 26b is consequently moved in the direction of the braking element 16b, as a result of a spring force of the spring element 32b. The counter-braking element 26b in this case is pivoted about the rotation axis 14b, along a direction 28b, by a spring force of the spring element 32b and by the pins 44b, 106b acting in combination with the grooves 48b, 110b, and at the same time is moved, along a direction 30b, in the direction of the braking element 16b, until the counter-braking element 26b comes into contact with the braking element 16b, which is realized as a brake disk 76b. Consequently, the frictional contact between the braking element 16b and the counter-braking element 26b is closed. The combined action of the pins 44b, 106b and the grooves 48b, 110b additionally effects self-locking as a result of the counter-braking element 26b being concomitantly driven in rotation by the braking element 16b rotating with the drive shaft. As a result of this, the drive shaft, still coasting down after an energy supply has been interrupted, is braked.

The invention claimed is:

1. A power-tool braking device, comprising:
  at least one mechanical braking unit that includes:
    at least one braking element mounted so as to be rotatable about a rotation axis; and
    a counter braking element configured to move relative to the at least one braking element;
  at least one actuating unit that includes at least one movably mounted actuating element, the actuating unit being configured to one or more of activate and deactivate the at least one braking unit; and
  at least one movement conversion unit that includes at least one movement conversion element configured to convert a movement of the at least one actuating element into a movement of the counter-braking element of the at least one braking unit, at least in a direction that is substantially transverse from a direction extending along the rotation axis of the at least one braking element, and that is substantially transverse from a direction of motion of the at least one actuating element.

2. The power-tool braking device as claimed in claim 1, wherein the at least one movement conversion element is pivotably mounted.

3. The power-tool braking device as claimed in claim 1, wherein the at least one braking unit further includes:
  at least one spring element configured to apply a spring force to the counter-braking element in the direction of the braking element.

4. The power-tool braking device as claimed in claim 1, wherein the at least one movement conversion element is configured as a rocker having a pivot axis that is at least substantially perpendicular to the rotation axis.

5. The power-tool braking device as claimed in claim 4, wherein:
  the at least one actuating unit further includes a coupling element that is fixed to the at least one actuating element so as to convert the movement of the at least one actuating element; and
  the rocker has at least one angled region configured to act in combination with the coupling element of the at least one actuating unit.

6. The power-tool braking device as claimed in claim 4, wherein the counter-braking element is fixed to the rocker.

7. The power-tool braking device as claimed in claim 1, wherein the at least one movement conversion unit is configured as a cam mechanism.

8. The power-tool braking device as claimed in claim 7, wherein:
  the at least one movement conversion unit further includes at least one further movement conversion element; and
  the at least one the movement conversion element is configured as a pin configured to act in combination with the at least one further movement conversion element of the movement conversion unit so as to convert the movement of the at least one actuating element.

9. The power-tool braking device as claimed in claim 8, wherein the at least one further movement conversion element is configured as a groove in which the pin partially engages.

10. The power-tool braking device as claimed in claim 1, wherein the power-tool braking device is configured as a hand power-tool braking device.

11. A portable power tool, comprising:
  at least one power-tool braking device, the power-tool braking device including:
    at least one mechanical braking unit having:
      at least one braking element mounted so as to be rotatable about a rotation axis; and
      a counter braking element configured to move relative to the at least one braking element;
    at least one actuating unit that includes at least one movably mounted actuating element, the at least one actuating unit being configured to one or more of activate and deactivate the at least one braking unit; and
    at least one movement conversion unit having at least one movement conversion element configured to convert a movement of the at least one actuating element into a movement of the counter-braking element of the at least one braking unit, at least in a direction that is substantially transverse from a direction extending along the rotation axis of the at least one braking element, and that is substantially transverse from a direction of motion of the at least one actuating element.

12. The portable power tool as claimed in claim 11, wherein the portable power tool is configured as an angle grinder.

13. A power-tool braking device, comprising:
  a mechanical braking unit operable to brake a power tool, including:
    a braking element mounted to be rotatable about a rotation axis; and
    a counter braking element configured to move relative to the braking element;
  an actuating unit configured to operate the braking unit, and including a movably mounted actuating element; and
  a movement conversion unit that includes:
    a rocker that is pivotably mounted about a pivot axis that is at least substantially perpendicular to the rotation axis,
    the rocker configured to convert a movement of the actuating element into a different movement of the counter-braking element, and
    the different movement being in a direction that differs from a direction extending along the rotation axis.

14. The power-tool braking device as claimed in claim 13, wherein the braking unit further includes:
  at least one spring element configured to apply a spring force to the counter-braking element in a direction of the braking element.

15. The power-tool braking device as claimed in claim 13, wherein:
  the actuating unit further includes a coupling element fixed to the actuating element; and
  the rocker defines at least one angled region, configured to act in combination with the coupling element to convert the movement of the actuating element.

16. The power-tool braking device as claimed in claim 13, wherein the counter-braking element is fixed to the rocker.

* * * * *